G. P. PAPPADAKES.
RESILIENT WHEEL.
APPLICATION FILED NOV. 16, 1914.
1,142,907.
Patented June 15, 1915.
3 SHEETS—SHEET 1.
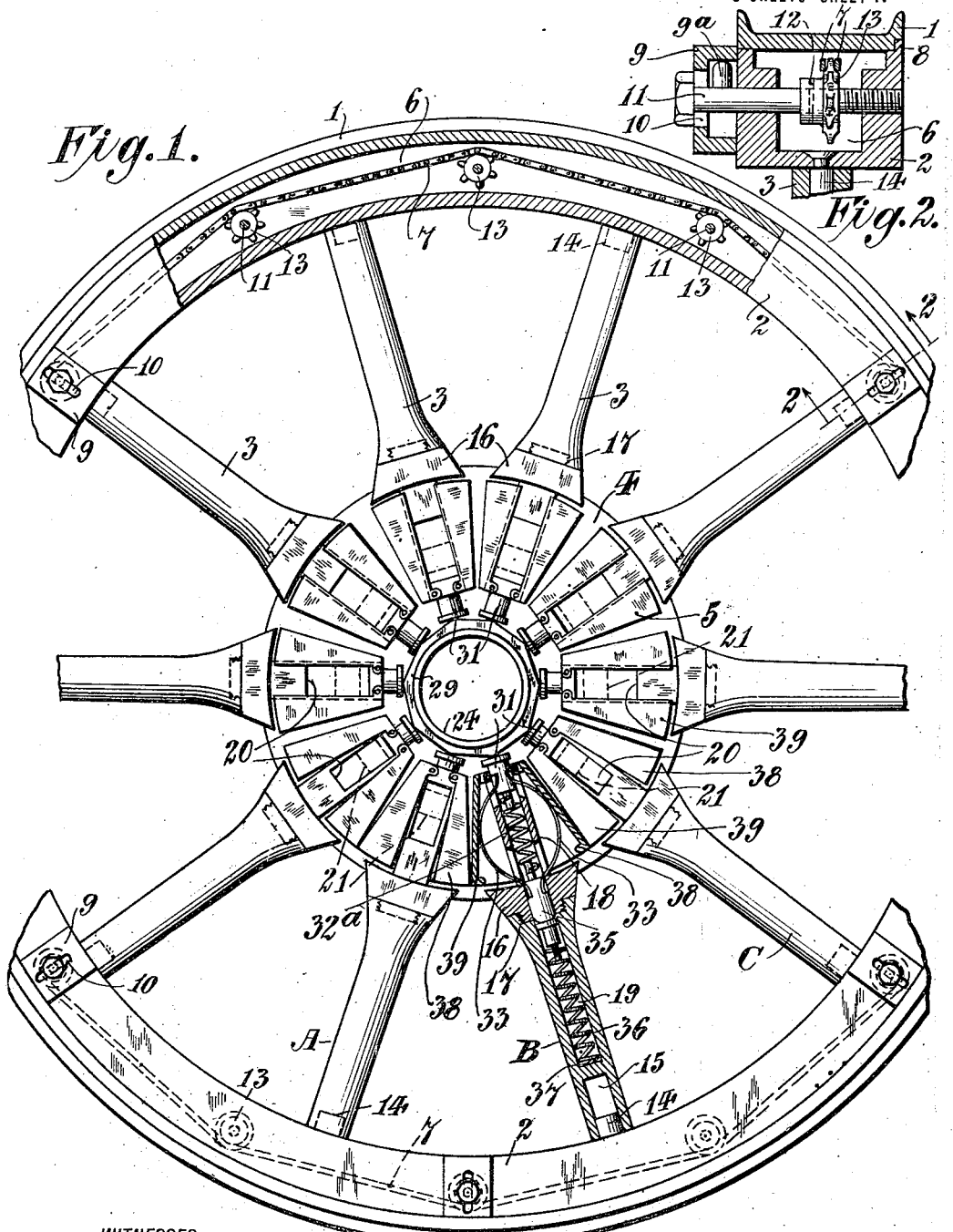

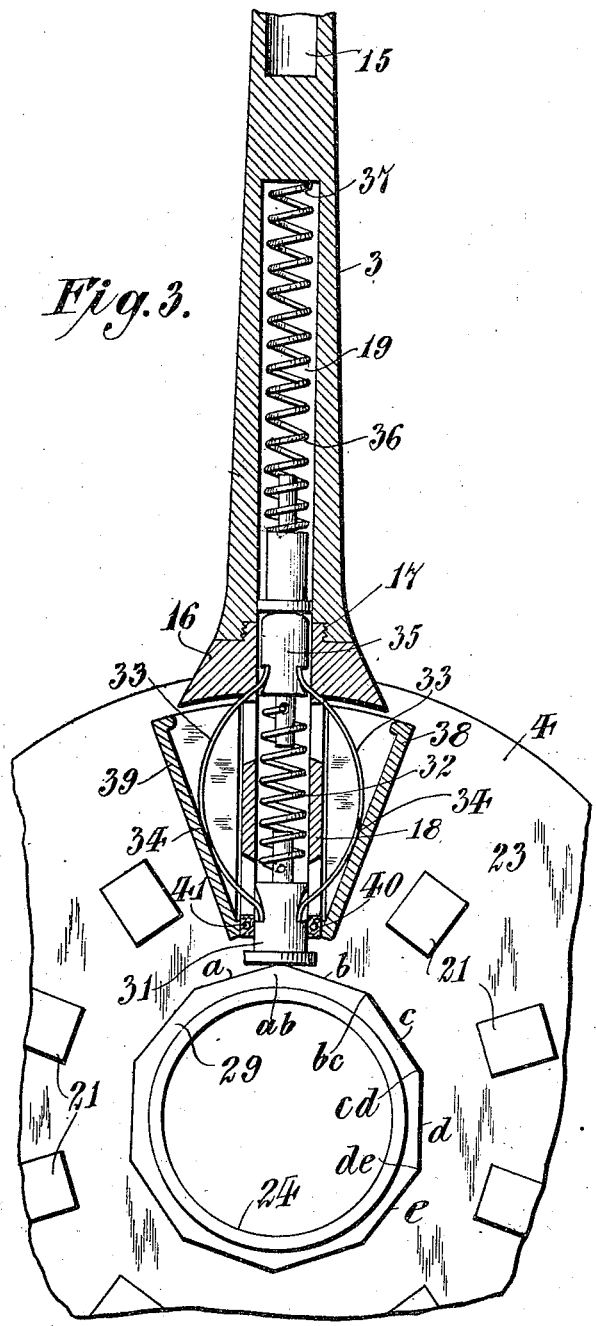
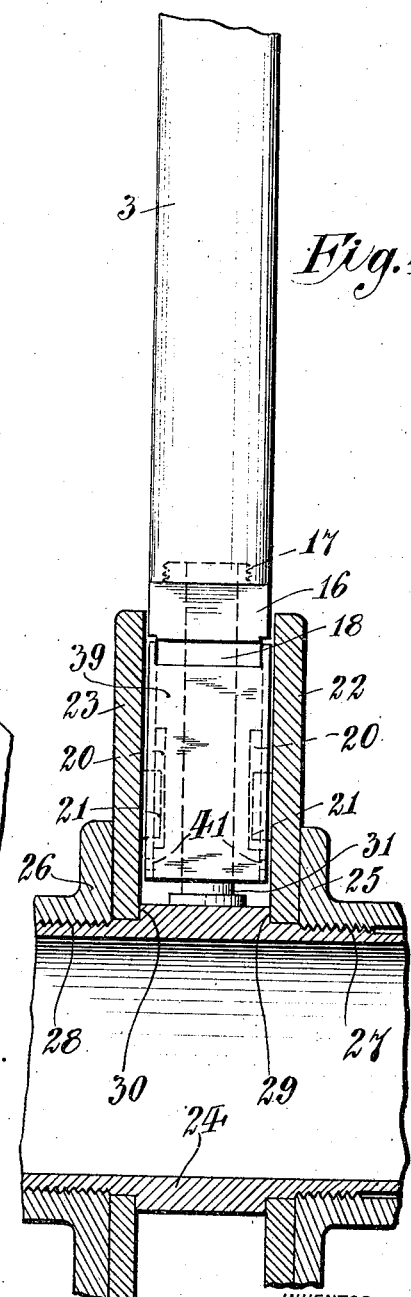

G. P. PAPPADAKES.
RESILIENT WHEEL.
APPLICATION FILED NOV. 16, 1914.

1,142,907.

Patented June 15, 1915.
3 SHEETS—SHEET 3.

WITNESSES

INVENTOR

BY

ATTORNEYS

UNITED STATES PATENT OFFICE.

GUST P. PAPPADAKES, OF NEW YORK, N. Y.

RESILIENT WHEEL.

1,142,907.  Specification of Letters Patent.  Patented June 15, 1915.

Application filed November 16, 1914. Serial No. 872,351.

*To all whom it may concern:*

Be it known that I, GUST P. PAPPADAKES, a subject of the King of Greece, and a resident of the city of New York, borough of Manhattan, county and State of New York, have invented a new and Improved Resilient Wheel, of which the following is a specification.

The invention relates to wheels and particularly such as utilize a yieldable tire on the outer rim thereof.

The invention is also directed to a wheel construction in which the spokes thereof are resiliently supported at their inner ends.

Figure 5:
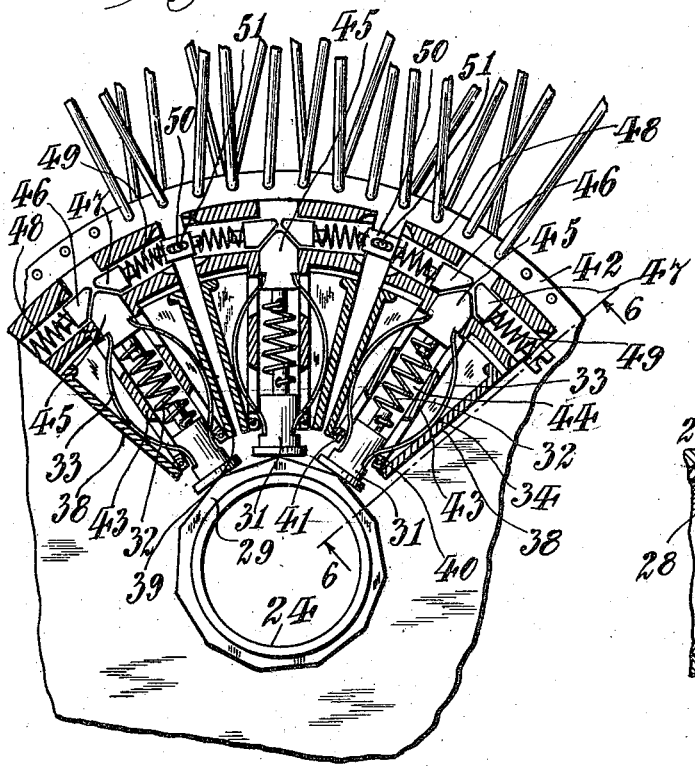
Figure 6:
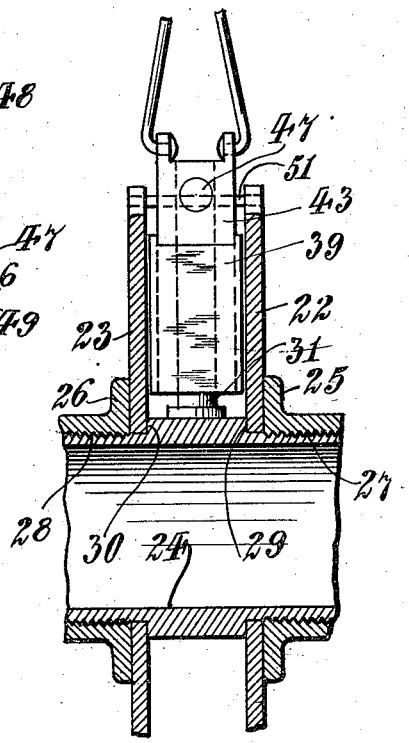

As showing certain specific embodiments of the invention, reference is made to the drawings forming a part of this specification, and in which drawings, Figure 1 is a side view of a wheel embodying my invention. In said figure certain portions of the wheel have been either broken away or removed. Fig. 2 is a cross sectional view taken as on the line 2—2, Fig. 1. Fig. 3 is a detail view showing a spoke in section and the means for resiliently supporting said spoke. Fig. 4 is a view showing a portion of the hub in section and illustrating the outside view of the members which constitute a part of the means for resiliently supporting the spoke. Fig. 5 shows a construction whereby a resilient supporting mechanism is provided between the inner ends of the wire spokes of a wheel and the hub of the same; and Fig. 6 is a view taken on the line 6—6 of Fig. 5.

The wheel comprises a rim 1, a felly 2, spokes 3, a hub 4, and means 5 located between the hub and the inner ends of the spokes for resiliently supporting the latter on the hub.

In the form shown in Figs. 1 to 4 the felly 2 is hollowed out, as at 6, in order to provide a receiving space for a flexible member or chain 7 that extends circumferentially of the wheel. The function of this chain 7 will hereinafter be referred to more in detail. The rim 1 may be made in a single piece, as indicated on the drawings, but is constructed so that it can be readily removed from the felly, whereby the tire that is on the wheel can be removed and replaced by another, should such replacement become necessary or advisable. When in place the rim 1 is in engagement with the resisting ledge 8 that is on the felly, being located on what is hereinafter referred to as the inner side of the felly, and the rim is forced in engagement with said resisting ledge by the holding clips 9 which engage both the rim and the felly. From an inspection of Figs. 1 and 2, it will be observed that these clips, which will hereinafter be referred to as rim holding clips, are provided with slots 10 through which pass bolts 11 that have a screw-threaded connection to the felly 2, at the inner side of the felly. Each of these bolts 11 has secured thereto, as by means of a pin 12, a sprocket-wheel 13. The flexible member or chain 7, previously referred to, engages these sprocket-wheels whereby, when any one of the bolts is turned as by a wrench, they will all be caused to simultaneously rotate to either loosen them whereby the clips can be moved from the rim holding position or to tighten them whereby the clips will be retained in rim holding position, as the case may be. The bolts are each provided with a pin $9^a$ that extends away from the center of the wheel, as shown in Fig. 2 whereby said clip 9 will be prevented from slipping toward the center of the wheel. The outer ends of the spokes are retained in place on the felly by means of projections 14 on the rim that enter and fit the recessed portion 15 of the spokes. The inner ends of the spokes 3 are each provided with cap-members 16 which have a screw-connection 17 to the rest of the spoke proper. Each of these cap-members comprises as an integral part thereof an inwardly extending portion which constitutes a casing or frame member 18. The spoke proper, including the cap-member just referred to, has an opening 19 for receiving therein certain springs and sliding members hereinafter referred to. Each of the casing members 18 is provided on opposite sides thereof with radially extending recesses 20 for receiving therein projections 21, the latter of which are on the inner and outer flanges 22 and 23 of the hub.

It will be noted from an inspection of Fig. 4 that the hub proper comprises the shell-member 24, the inner and outer flanges 22 and 23, and the inner and outer clamping rings 25 and 26. These clamping rings have screw connections as at 27 and 28 to the shell member 24, whereby the clamping rings 25 and 26 can fixedly secure in place the flanges 22 and 23 by clamping the latter between the rings and the resisting ledges 29 and 30 of the shell-member 24. From a further inspection of said Fig. 4, it will be observed that the radially extending recesses 20 are longer than the projections 21 entering the same, and this is to allow a movement to take place between the hub and the spokes; in other words, a floating hub-construction is provided. A cross section of that portion of the shell-member 24 which is located between the holding flanges 22 and 23 is in the form of a polyhedron and, according to the construction shown in Fig. 3, this polyhedron has ten faces, as *a b c d*, etc. At each vertex of the polyhedron, for instance, *ab bc cd*, etc., there is located an inner spring resistance plug 31. This spring resistance plug receives the thrusts which are imparted to it by the inner end of the coil compression spring 32 and by the inner ends of the bow-shaped springs 33. This plug slides in the casing member 18. The outer ends of the springs just referred to engage a plug 35 that is slidably mounted within the opening or hollowed portion 19 of the spoke 3. This sliding plug 35 is engaged by the inner end of a coil compression spring 36, the outer end of which spring is seated at 37, preferably near the outer end of the spoke. The curved portion of the bow-shaped springs 33 engages at 34 with the wing-members 38 and 39 that are respectively pivotally connected at 40 and 41 to the inner end of the casing or frame member 18.

When the wheel is in use, the hub is in the position as shown in Fig. 1, and it will be observed that the pressure received on the outer under-side of the rim, or in other words the downward pressure received on the hub causes a compression of the coils 36 which are in the spokes that are in the lower portion of the wheel. In said figure it will be observed that the hub has approached the lower portion of the rim and that with the compressing of the spring 32 a corresponding bending of the springs 33 also took place so as to increase the bow of these springs. In other words, with the compressing of the coil spring 32 there is a tendency on the part of the bow-springs 33 to force the wing-members 38 and 39 away from the center of the spoke upon which said members are mounted.

From a further inspection of Fig. 1, it will be noted that the bow-shaped springs, in spoke B for example, cause the wing member 38 of said spoke B to engage and press against the wing member 39 of spoke C, and the wing member 39 of spoke B to engage and press against the member 38 of spoke A. Spokes A and C will also yield to some extent to the pressure on the wheel and the wing members 38 on each of the spokes, especially at the underside of the wheel, will engage and press against the wing members 39 of the adjacent spokes, whereby the pressure transmitted by means of the springs 33 to the wing members will, in a measure, be transmitted to a greater or less extent around the hub of the wheel. The projections 21 which are on the inner and outer hub flanges have a sufficient fit with the recessed portions on each of the spokes to insure a proper turning of the hub with the rest of the wheel but there is sufficient play between the projections 21 and the casing members 18, in which the recessed portions 20 are provided, to permit a slight angular movement of the spokes relative to the hub; for instance, such movement as results from the hub being allowed to approach the underside of the wheel when it is supporting a load.

In the construction shown in Figs. 5 and 6 a series of wire spokes is provided which forms a rigid connection between the felly of the wheel and a continuous circular member 42 at the central portion of the wheel. This member 42 has a number of radially extending casing members 43. These casing members 43 correspond in their function to the casing members 18, referred to in connection with the construction shown in Figs. 1 to 4. The members 43 are each provided with an opening 44 within which the coil compression springs 32 are located. The hub construction, comprising the shell member 24, the inner and outer flanges 22 and 23, and clamping rings 25 and 26 is the same as that shown in connection with the construction in Figs. 1 to 4, and the same is true of the polyhedron portion between the inner and outer flanges. A resistance plug 31 rests upon each of the vertices of this polyhedron portion. These resistance plugs receive the thrust from the inner ends of the compression springs 32 and the bow-shaped spring 33, and said plugs are slidably mounted in said casings 43. The outer ends of the compression springs 32 and bow-shaped springs 33 engage a wedge-shaped member 45 which is arranged to transmit any force imparted to it by the springs 32 and 33, to the sliding plugs 46 and 47 which together constitute a set of thrust absorbing and thrust transmitting members. A part of the force which has been transmitted to the plugs 46 and 47, by the wedge-shaped plug 45, is transmitted in opposite directions to the springs 48 and 49. Between adjacent springs 48 and 49 movable plugs 50 are located, which plugs 50 are loosely retained in place by pins 51 that extend to the inner and outer flanges 22 and 23 so that the hub of the wheel will be sure to rotate with the rest of the wheel. The construction, however, is of such a character that the hub can float, so to speak, relative to the circular member to which the inner ends of the spoke are connected whereby a relative yielding movement can take place between the hub and the wheel rim when the wheel is in use.

From an inspection of Fig. 5, it will be manifest, when there is a relative approach between the hub and the lower portion of the wheel that the springs 32 at the lower side of the wheel will be compressed, that the bowing of the springs 33 will be increased, that a pressure of the spring 33 will be imparted to the wing members 38 and 39, and that there will be an increased pressure of the wedge-shaped member 45 against the sliding plugs 46 and 47. Consequently, the wing members at the lower side of the wheel will transmit a certain amount of force to the wing members adjacent to them; also the several springs 48 and 49 will transmit force to the plugs 50. In other words, the forces supplied to the springs 32 and 33 are transmitted to a greater or less extent around the hub.

The improvements herein set forth are not limited to the precise construction and arrangement shown and described, as they may be embodied in various forms and modifications without departing from the spirit and scope of the invention.

Hereinafter, in the claims, reference is made to the spoke construction, and it will be observed that in the form of wheel shown in Fig. 1 the spoke construction comprises the several spoke members A B C, etc., having at their inner ends or the end nearest the hub the cap-members 16 which are provided with the integral portions 18; while in the form of wheel shown in Fig. 5 the spoke construction comprises the several wire spokes that are connected to the circular member 42, which circular member is in turn provided with the casing members 43.

I claim as my invention—

1. A wheel of the class described having a felly, spokes connected thereto, a floating hub, and means between said hub and spokes to permit a relative movement between the hub and the felly of the wheel, said means comprising a resistance plug seated on the hub and a sliding plug coöperating with said resistance plug, said sliding plug being located in an opening in a spoke, there being located between each sliding plug and its coöperating resistance plug a coil spring and two bow-shaped springs that are located on opposite sides of the coil spring, the ends of all of said springs being in engagement with the plugs between which they are located.

2. A wheel of the class described having a felly, spokes connected thereto, a floating hub, and means between each of said spokes and said hub, whereby the relative movement can take place between the hub and the felly, said means comprising a plug that engages a portion of the hub, a coil spring and two bow-shaped springs that engage said plug, and which springs also engage a plug slidably mounted in a spoke, and a second coil spring coacting with said slidable plug.

3. A wheel of the class described having a felly, a spoke construction connected thereto, a floating hub, and means between said spokes and said hub whereby a relative movement can take place between the hub and the felly, said means comprising a resistance plug that engages a portion of the hub, a coil spring, and two bow-shaped springs that engage said plug, and which springs also engage a plug slidably mounted, a compression spring engaging said last-mentioned plug, the outer end of said spring being seated within a spoke; there being also provided two wing members which are engaged by the bow-shaped springs whereby, when the bow of the said springs is increased as due to the load being carried by the wheel, the force received by the said wing members from said springs will in turn be transmitted to other similar adjacent wing members and springs.

4. A wheel of the class described having a felly, spokes connected thereto, a hub having flanges between which the spokes are slidably connected, each of said spokes being provided with a compression spring that is bodily movable, a slidable plug engaged by said compression spring and another compression spring which operates in conjunction with said slidable plug, there also being comprised within the wheel and coöperating with said slidable plug, bow-shaped springs which press against yielding wing members, whereby the force received by said wing members from said bow-shaped springs will be transmitted at least partially around the hub of the wheel.

5. A wheel having a felly, spoke construction connected thereto, a hub yieldably connected to the spoke construction so that the hub, spokes and felly will rotate together; movable resistance plugs resting on the hub, slidable plugs mounted in the spoke construction, bow-shaped springs engaging said plugs, and spring means mounted in the spoke construction and arranged to coöperate with the slidable plugs, the construction and arrangement of the parts being such that any thrust imparted to the slidable plugs in the spoke construction will be transmitted, in part at least, for a distance about the hub of the wheel by at least a part of said bow-shaped springs.

6. A wheel of the class described having a felly, a spoke construction connected thereto, and a floating hub connected to the spokes in such a manner that the felly, spokes and hub will turn together, the wheel being provided between the spokes and hub with means comprising compression springs which engage plugs slidably mounted on a portion of the spoke construction, and a second set of springs which engage the said slidably mounted plugs and coöperate therewith and with said hub so that when a force is transmitted to said plugs the movement thereof will exert a force on the second mentioned springs and then effect a transmission of some of said force at least a partial distance around the hub of the wheel.

7. A wheel having a felly, spoke construction connected thereto, and a hub yieldably connected to the spoke construction but so that the hub, spokes and felly will rotate together, a movable resistance plug seated on the hub, a slidable plug mounted in the spoke construction, a coil spring located between and engaging said plugs, bow-shaped springs engaging said plugs, and a compression spring mounted in the spoke construction and arranged to coöperate with the slidable plug in the spoke construction, the construction and arrangement of the parts being such that any thrust imparted to the slidable plug in the spoke construction will be transmitted in part at least for a distance about the hub of the wheel.

This specification signed and witnessed this 6th day of November 1914.

GUST P. PAPPADAKES.

Signed in the presence of—
EDWIN A. PACKARD,
G. McGRANN.

Copies of this patent may be obtained for five cents each, by addressing the "Commissioner of Patents, Washington, D. C."